Figure 1:
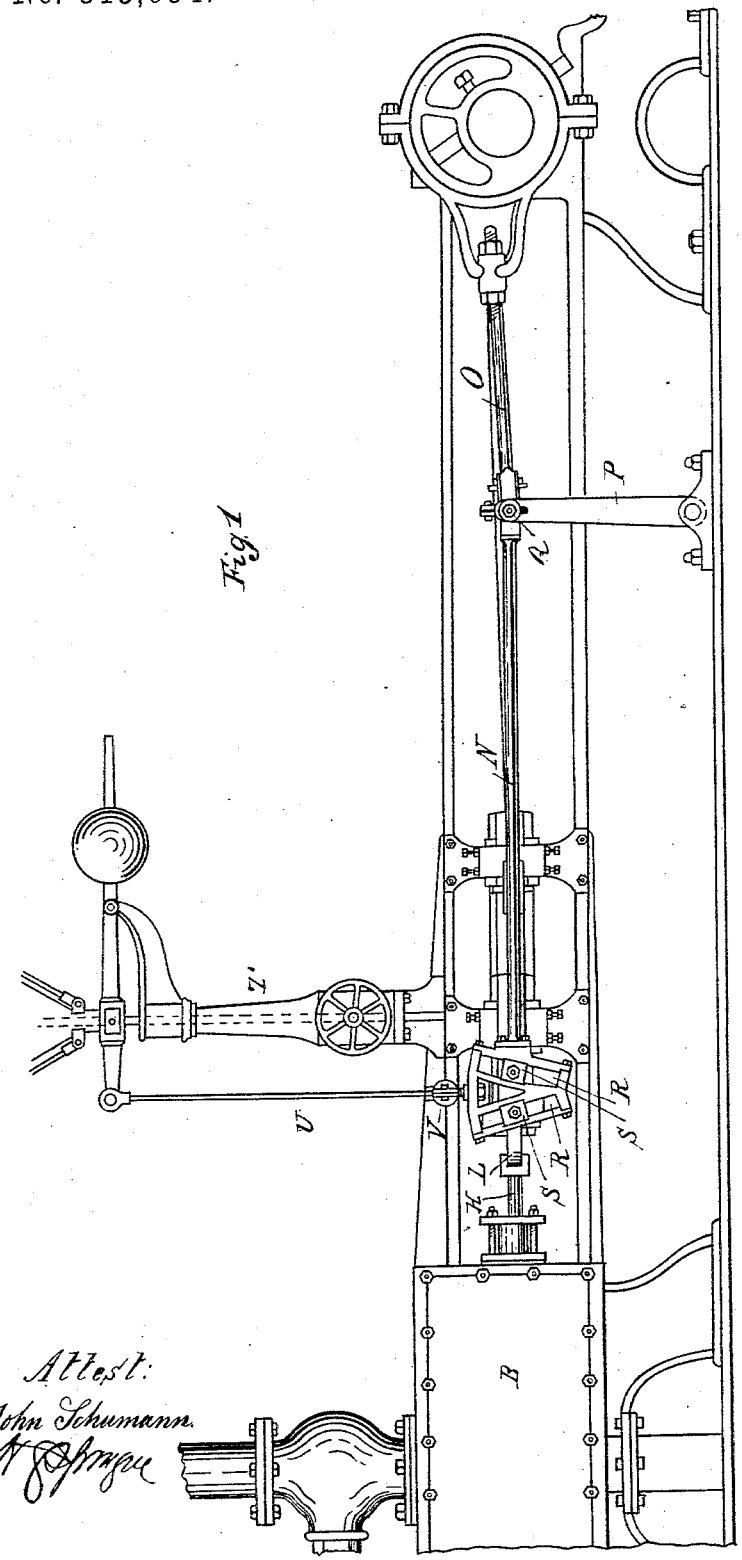

(No Model.) 2 Sheets—Sheet 1.
J. NEUERT.
VALVE GEAR FOR STEAM ENGINES.

No. 315,654. Patented Apr. 14, 1885.

Attest:
John Schumann

Inventor:
Jacob Neuert
by his Atty.

(No Model.) 2 Sheets—Sheet 2.
J. NEUERT.
VALVE GEAR FOR STEAM ENGINES.
No. 315,654. Patented Apr. 14, 1885.
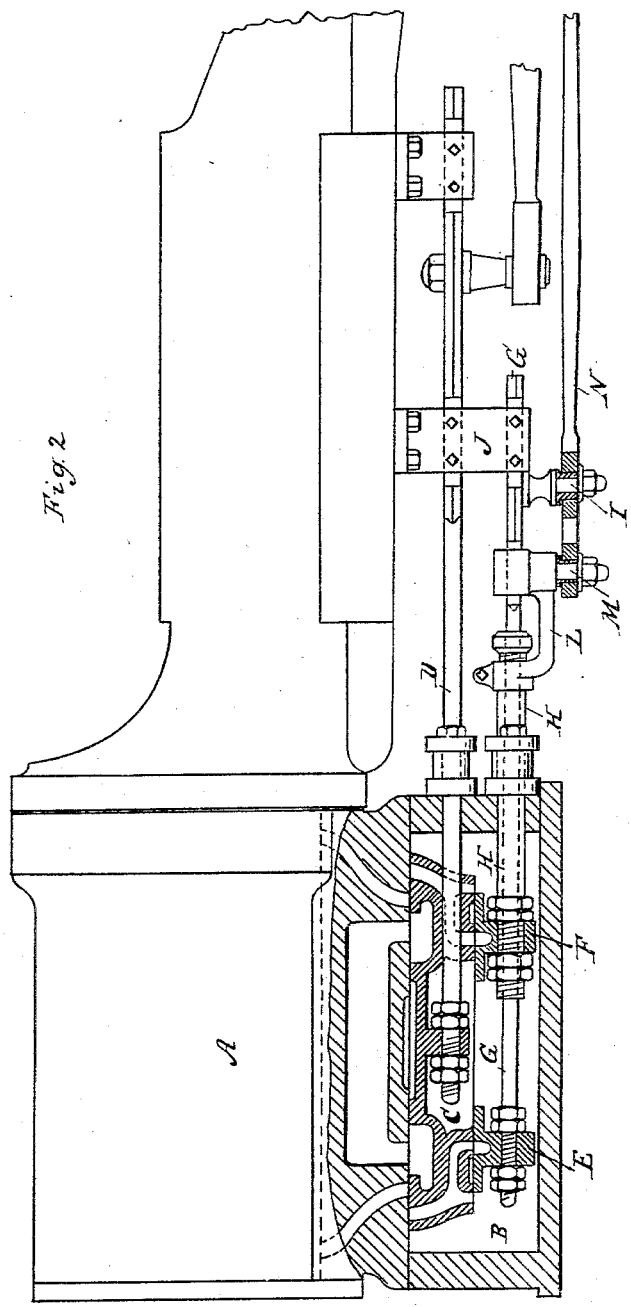
Attest:
John Schumann
Inventor:
Jacob Neuert
by his Atty

UNITED STATES PATENT OFFICE.

JACOB NEUERT, OF SANDUSKY, OHIO.

VALVE-GEAR FOR STEAM-ENGINES.

SPECIFICATION forming part of Letters Patent No. 315,654, dated April 14, 1885.

Application filed November 5, 1884. (No model.)

*To all whom it may concern:*

Be it known that I, JACOB NEUERT, of Sandusky, in the county of Erie and State of Ohio, have invented new and useful Improvements in Valve-Gears for Steam-Engines; and I do hereby declare that the following is a full, clear, and exact description thereof, reference being had to the accompanying drawings, which form a part of this specification.

This invention relates to an improvement in automatic cut-offs for steam-engines; and it refers more specifically to that class of cut-offs wherein the variable motion of the governor automatically controls the movement of the cut-off valves according to the amount of power required.

The invention consists in the peculiar combinations and the construction and arrangement of parts hereinafter more fully described and claimed.

In the drawings which accompany this specification, Figure 1 is an elevation of an engine to which my automatic cut-off-valve gear is applied. Fig. 2 is a plan of the valves and valve-gear, partly in horizontal section.

A is the steam-cylinder; B, the steam-chest; C, the main valve; D, the main valve stem operated by an eccentric, and E F the two cut-off valves for the two sides of the pistons, all these parts being constructed and operating in a well-known manner.

G and H are the stems of the cut-off valves. They are passed out through the valve-chest, one inside the other, and provided with the necessary stuffing-boxes in the usual manner. The valve-stem G extends beyond the other, and its free end slides through a bearing, J. Near its forward end it is provided with a wrist-pin, I. The valve-stem H has clamped to its forward end a yoke, L, to which the wrist-pin M is secured. The forward end of the yoke L is fitted upon the valve-stem G and gibbed thereon.

N is a reciprocating link forming, in connection with the eccentric-rod O, the valve-rod which operates the cut-off valves. The eccentric-rod O connects with the link N at Q by means of the rock-arm P, to which both are pivotally secured. The reciprocating end of the link N is provided with two inversely-inclined slots, R R, into which the wrist-pins M I of the cut-off valves respectively engage by means of steel blocks S S, fitted into the oblique slots.

T is a governor which may be of any construction. Its variable motion is made to move the link N by connecting it therewith in any suitable manner. The governor shown in the drawings communicates its variable motion by means of the rod U, which connects with the link N by a ball-and-socket joint, V, and moves it in a vertical plane around its pivotal point Q.

It will be seen that in operation the constant and unalterable movement given to the cut-off valves by the eccentric W is controlled by the variable motion of the governor, which, in reciprocating the link N, forces the valve-rods G H in opposite direction, thereby shortening or lengthening the cut-off upon both sides of the piston according to the prescribed speed of the engine. The yoke L guides the valve-stem H, and its adjustability upon its valve-stem affords, in connection with the usual adjustment provided for the eccentric-rod O, a ready means to adjust the wrist-pins M I within the oblique slots, so as to bring them at the normal action of the engine in about a mid-position therein.

The cut-off-valve gear herein described can be easily altered to suit such engines which have separate steam-chests with main and cut-off valves at each end of the cylinder.

I am aware of the Patent No. 123,500, and make no claim to the construction shown therein as forming part of my invention.

What I claim as my invention is—

1. In an automatic cut-off, the reciprocating link N, provided at one end with two inversely-inclined slots, R R, in combination with the valve-stems G H, provided with the wrist-pins I M, and the vibrating end of said link suspended from a connection with the governor, substantially as and for the purposes specified.

2. In an automatic cut-off, the combination, with the valve-stem G, having a wrist-pin, I, of the valve-stem H, sleeved upon said stem G, the yoke L, secured to the stem H, and provided with a wrist-pin, M, and the reciprocating link N, provided with the inversely-inclined slots R R, in which said wrist-pins work, substantially as and for the purpose specified.

3. In an automatic cut-off, the combination, with the valve-stem G, sliding through the bearing J, and provided with a wrist-pin, I, and the valve-stem H, the yoke L, adjustably secured thereto and provided with a wrist-pin, M, of the reciprocating link N, having two inversely-inclined slots, R R, and the rod U, connecting said link directly with the governor, substantially as and for the purpose set forth.

JACOB NEUERT.

Witnesses:
CHARLES DICK,
C. MILLER.